United States Patent
Fiebig et al.

(10) Patent No.: US 8,922,164 B2
(45) Date of Patent: Dec. 30, 2014

(54) EQUIPMENT SYSTEM COMPRISING A BATTERY-OPERATED ELECTRICAL DEVICE, A RECHARGEABLE BATTERY UNIT, AND A BATTERY CHARGER

(75) Inventors: Arnim Fiebig, Leinfelden-Echterdingen (DE); Hans-Joachim Baur, Leinfelden-Echterdingen (DE); Guenther Lohr, Leinfelden-Echterdingen (DE); Stefan Roepke, Leinfelden (DE); Rainer Glauning, Aichtal-Groetzingen (DE); Volker Bosch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 34 days.

(21) Appl. No.: 13/371,978

(22) Filed: Feb. 13, 2012

(65) Prior Publication Data

US 2012/0139497 A1 Jun. 7, 2012

Related U.S. Application Data

(63) Continuation of application No. 12/414,138, filed on Mar. 30, 2009, now Pat. No. 8,148,941, which is a continuation of application No. 10/335,842, filed on Jan. 2, 2003, now abandoned.

(30) Foreign Application Priority Data

Jan. 30, 2002 (DE) .................................. 102 03 512

(51) Int. Cl.
*H02J 7/00* (2006.01)
*H02J 7/14* (2006.01)

(52) U.S. Cl.
CPC ............. *H02J 7/0086* (2013.01); *H02J 7/0091* (2013.01)
USPC ............ 320/114; 320/110; 320/112; 320/132

(58) Field of Classification Search
USPC ......... 320/134, 136, 114, 106, 112, 126, 132, 320/101, 142, 147, 127, 113, 115, 116, 320/135; 302/106, 112, 114, 126, 132, 101, 302/142, 147
See application file for complete search history.

(56) References Cited

U.S. PATENT DOCUMENTS

| 5,057,383 A | 10/1991 | Sokira |
| 5,206,097 A | 4/1993 | Burns et al. |

(Continued)

FOREIGN PATENT DOCUMENTS

| CN | 2033781 | 3/1999 |
| EP | 0 198 707 A2 | 10/1986 |

(Continued)

OTHER PUBLICATIONS

Nagai Y. et al., "DC Switching Power Supply System Including Monitoring of the Battery," Proceedings of the International Telecommunications Energy Conference (Intelec), Firenze, Oct. 15-18, 1989, vol. 1, No Conf. 11, Oct. 15, 1989, IEEE, pp. 11-5 1-08, XP0001.

*Primary Examiner* — Edward Tso
*Assistant Examiner* — Alexis A Boateng
(74) *Attorney, Agent, or Firm* — Kenyon & Kenyon LLP

(57) ABSTRACT

An equipment system includes a battery unit (10) having a monitoring circuit (14), which detects at least one operating parameter of the battery unit (10) and furnishes a control signal, dependent on the operating parameter, for switching means (25, 31). The switching means control the charging and discharging process of the battery unit (10) and are located in the electrical device (20) and in the charger (30), respectively. From the battery unit (10), the control signal is transmitted to the switching means (25, 31) in the electrical device (20) and in the charger (30), respectively. By this provision of shifting the switching means (25, 31) out of the battery unit (10) into the electrical device (20) and into the charger (30), respectively, the heat development in the battery unit (10) and also its structure size are reduced.

44 Claims, 2 Drawing Sheets

(56) References Cited

U.S. PATENT DOCUMENTS

| | | | |
|---|---|---|---|
| 5,309,080 A * | 5/1994 | Odendahl et al. ............. 320/150 |
| 5,514,946 A | 5/1996 | Lin et al. |
| 5,541,489 A | 7/1996 | Dunstan |
| 5,557,188 A | 9/1996 | Piercey |
| 5,576,611 A | 11/1996 | Yoshida |
| 5,606,241 A | 2/1997 | Patino et al. |
| 5,606,242 A | 2/1997 | Hull et al. |
| 5,627,449 A | 5/1997 | Fujiki |
| 5,684,382 A | 11/1997 | Fritz et al. |
| 5,684,384 A | 11/1997 | Barkat et al. |
| 5,815,389 A | 9/1998 | Plow et al. |
| 5,859,524 A | 1/1999 | Ettes |
| 5,889,381 A * | 3/1999 | Wakefield ................... 320/106 |
| 5,903,764 A | 5/1999 | Shyr et al. |
| 5,973,497 A | 10/1999 | Bergk et al. |
| 5,994,874 A | 11/1999 | Hirose |
| 6,049,141 A | 4/2000 | Sieminski et al. |
| 6,078,164 A | 6/2000 | Park |
| 6,118,255 A | 9/2000 | Nagai et al. |
| 6,169,341 B1 | 1/2001 | Nagai |
| 6,191,554 B1 * | 2/2001 | Nakane et al. ............... 320/114 |
| 6,373,790 B1 * | 4/2002 | Fujisawa ...................... 368/204 |
| 6,384,572 B1 | 5/2002 | Nishimura |
| 6,388,426 B1 | 5/2002 | Yokoo et al. |
| 6,445,164 B2 | 9/2002 | Kitagawa |
| 6,459,175 B1 | 10/2002 | Potega |
| 6,502,949 B1 * | 1/2003 | Horiyama et al. ............. 362/119 |
| 6,509,718 B2 * | 1/2003 | Sakai et al. ................... 320/134 |
| 6,566,843 B2 * | 5/2003 | Takano et al. ................. 320/114 |
| 6,777,915 B2 | 8/2004 | Yoshizawa et al. |
| 2001/0010455 A1 * | 8/2001 | Brotto et al. .................. 320/106 |
| 2002/0079867 A1 * | 6/2002 | Sakakibara et al. .......... 320/152 |
| 2002/0089308 A1 * | 7/2002 | Sakurai ......................... 320/134 |
| 2003/0122525 A1 | 7/2003 | Stellberger |
| 2010/0213900 A1 * | 8/2010 | Carrier et al. ................. 320/134 |

FOREIGN PATENT DOCUMENTS

| | | |
|---|---|---|
| EP | 0 616 281 A2 | 9/1994 |
| EP | 0 665 628 A2 | 8/1995 |
| EP | 1 304 787 A1 | 4/2003 |
| GB | 2 276 783 | 10/1994 |
| JP | 9-312172 | 12/1997 |
| JP | 11-18314 | 1/1999 |
| JP | 11-500568 | 1/1999 |
| JP | 2000-326265 | 11/2000 |
| JP | 2000350374 | 12/2000 |
| JP | 2001-095158 | 4/2001 |
| JP | 2001-118607 | 4/2001 |
| JP | 2001095158 | 4/2001 |
| JP | 2000/184610 | 4/2009 |
| JP | 7241040 | 8/2010 |
| WO | WO 96/21954 | 7/1996 |
| WO | WO 01/22107 A1 | 3/2001 |

* cited by examiner

EQUIPMENT SYSTEM COMPRISING A BATTERY-OPERATED ELECTRICAL DEVICE, A RECHARGEABLE BATTERY UNIT, AND A BATTERY CHARGER

CROSS REFERENCE TO RELATED APPLICATIONS

This application is a continuation application of U.S. application Ser. No. 12/414,138, filed Mar. 30, 2009, which is a continuation application of U.S. application Ser. No. 10/335,842, filed Jan. 2, 2003, which claims foreign priority to German Application No. 102 03 512.1, filed Jan. 30, 2002; which applications are incorporated herein by reference in their entireties.

BACKGROUND OF THE INVENTION

The present invention related to an equipment system, comprising at least one battery-operated electrical device, a rechargeable battery unit, and a battery charger, in which the battery unit has a monitoring circuit, which includes at least one operating parameter of the battery unit and furnishes a control signal, dependent on the operating parameter, for switching means that control the charging and discharging process of the battery unit.

In EP 665 628 A2, a recharge battery unit is described, which, on one hand, can be connected to a battery-operated electrical device in order to provide electrical energy to this device, and on the other hand, is useable in a charger device, in order to receive energy from it to its recharger. In the battery unit, a monitoring device is located, which includes at least one operating parameter, for example, the charging or discharge current or the terminal voltage of the battery unit and which furnishes a control signal, dependent on the operating parameter(s), for the switching means furnished in the battery unit, which controls the charging or discharging process of the battery unit. This means, for example, that this switching means interrupts the current flux from the battery unit to a connected electrical device, when the monitoring circuit registers a falling-short of a given discharge increase. Likewise, the control means interrupts the current flux from a charging device in the battery unit, when the control means in initiated by means of the control signal of the monitoring circuit.

In the rechargeable battery unit of EP 665 628 A2, then switching means for controlling the monitoring circuit as well as the charging or discharging process of the battery unit are found. In particular, with battery units, in which very high charging or discharge current flow, such as, for example, with the use of electrical tool apparatus that are operated with relatively high capacity, the switching means must switch very high capacities, which leads to a correspondingly high heat formation in the battery unit. In addition, the structural size of a battery unit increases when a monitoring circuit as well as the switching means for controlling the charging and discharging process are integrated.

Likewise, such a battery unit, which includes the monitoring circuit and the switching means for controlling the charging and discharging process, is expensive. In an equipment system, comprising at least one battery-operated electrical device, a rechargeable battery unit, and a battery charger, the battery unit is subject to the greatest wear. Thus, it is particularly undesirable to raise the price of the battery unit by integration as many electronic switches as possible.

The present invention addresses the underlying problem of providing an equipment system, comprising at least one battery-operated electrical device, a rechargeable battery unit, and a battery recharge of the above-described type, in which the battery unit has the least possible expenditure on electronic switches, in order to avoid the development of heat in the battery unit and, in addition, to maintain the structural size of the battery unit to the smallest possible.

SUMMARY OF THE INVENTION

The above-described problem is resolved by the equipment system of the present invention having a battery unit, a battery charger, and a battery-operated electrical device, only the monitoring device is provided, which detects at least one operating parameter of the battery unit and furnishes a control signal dependent on the at least one operating parameter. The switching means, to which the control signal is supplied, for controlling the charging and discharging process of the battery unit, is located in the electrical device or charging device. Specifically, when the battery unit is connected to the electrical device, the switching means provided therein controls the capacity of the electrical device as a function of the control signal output from the battery unit. And when the battery unit is connected to the charging device, the switching means provided therein controls the transmitted charging current as a function of the control signals produced from the battery unit.

The switching means that control the charging and discharging process of the battery unit are located outside of the battery unit in the device connected to the battery unit. In this manner, the unit that is subject to the greatest wear and that is most frequently changed is disposed within the equipment system in a cost-effective manner.

The operating parameters detected by the monitoring circuit include the charging current flowing into the battery unit, and/or the terminal voltage of the battery unit, and/or the temperature of the battery unit, or a variable that is in relation to the temperature.

DETAILED DESCRIPTION OF THE PREFERRED EMBODIMENTS

Figure 1:
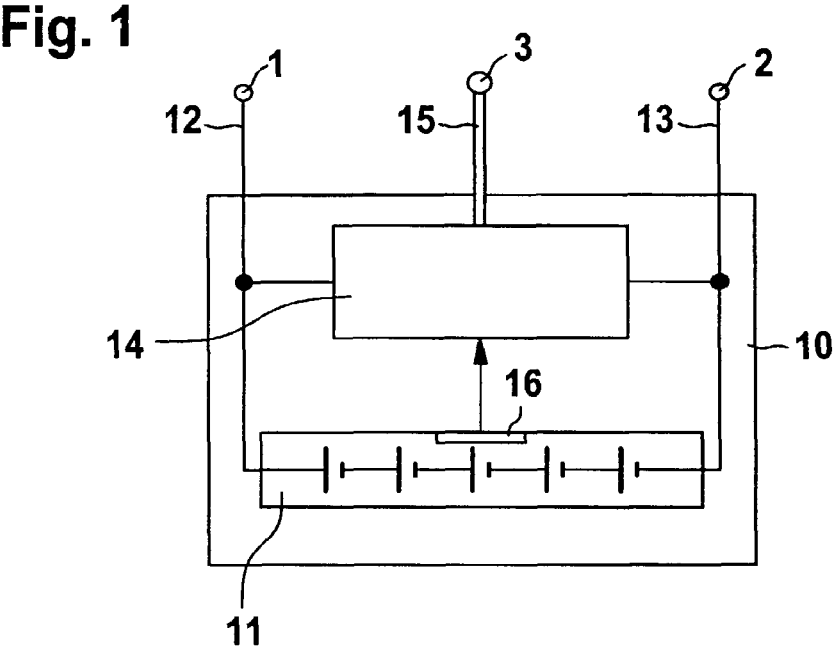
FIG. 1 shows a block diagram of a rechargeable battery unit.
Figure 2:
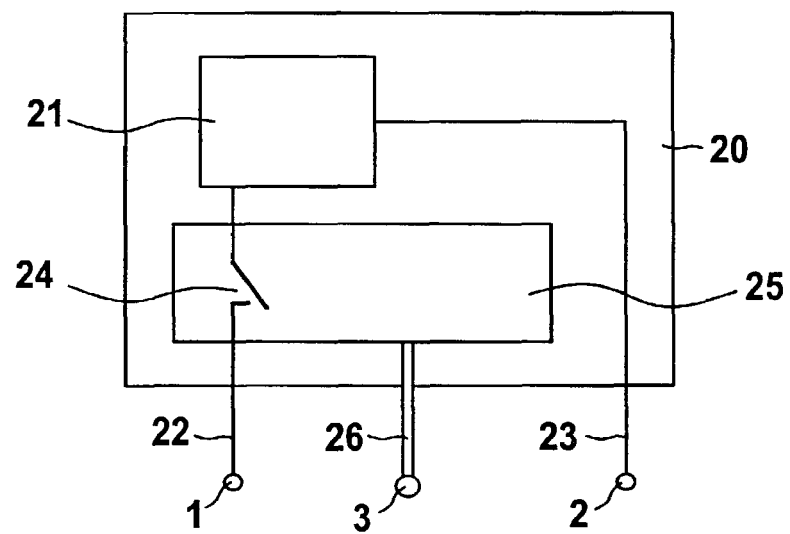
FIG. 2 shows a block diagram of an electrical device.
Figure 3:
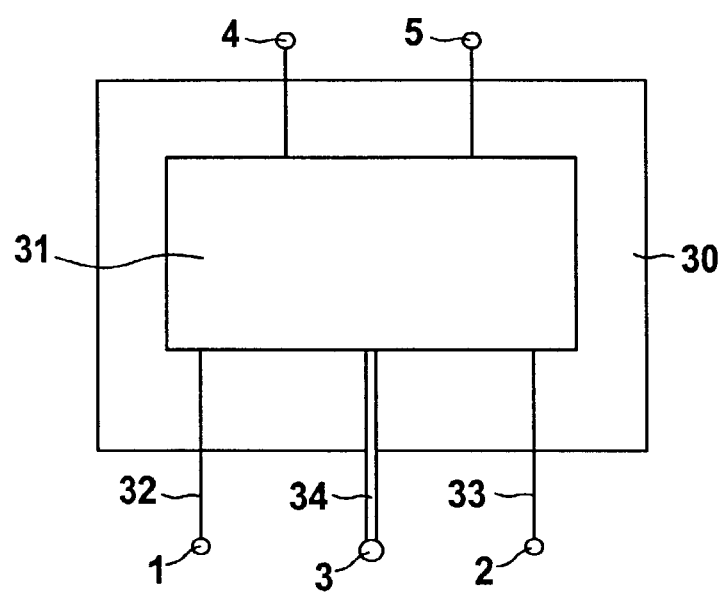
FIG. 3 shows a block diagram of a battery charger.

In FIGS. 1 through 3, the block diagrams of three units belonging to an equipment system are illustrated. FIG. 1 shows a rechargeable battery unit, FIG. 2 shows an electrical device 20—preferably, a hand-held tool (for example, a drill, a hammer drill, a saw, a grinder, and the like), and FIG. 3 shows a battery charger 30. The battery unit illustrated in FIG. 1 is connectable on the one hand to the energy supply on the electrical device 20 and on the other hand, to the recharger on the battery charger 30. The connections or terminals 1, 2, 3 leading from the battery unit 10 have corresponding connections or terminals on the electrical device 20 and the battery charger 30, which are designated with corresponding reference numerals 1, 2, 3.

The battery unit 10 contains one or more rechargeable battery cells 11, from whose plus and minus poles, supply lines 12, 13 lead to external supply connections 1, 2. In the battery unit 10, a monitoring circuit 14 is disposed. This monitoring circuit 14 detects one or more operating parameters of the battery unit, or more precisely, of the battery cells.

These operating parameters include, for example, the discharge current—that is the current flowing out of the battery unit upon connection of an electrical device 20—or the charging current—that is, the current flowing into the battery unit upon connection the charging device 30—and/or the terminal voltage of the battery cells(s), and/or the temperature of the battery cell(s), or a variable that is in relation to the temperature. For detection of the temperature of the battery cell(s), a temperature sensor 16 is disposed in the vicinity of the battery cell(s).

The monitoring circuit 14 conducts a control signal for the charging or discharging process of the battery unit from the respective operating parameter. As already known from the state of the art, for example, EP 665 628 A2 or DE 41 06 725 A1, such a control signal that is dependent on one or more operating parameters of the battery unit, serve to interrupt or reduce the current flow from the battery unit to an electric device connected thereto when the battery unit reaches a minimum charge threshold. Or the control signal serves to interrupt or reduced the charging process upon reaching an upper charging threshold or upper temperature threshold when the battery unit 10 is connected to a charging device 30, that is, the current flow between the charging device 30 and the battery unit 10 is interrupted or reduced. The monitoring circuit 14 distributes the control signal via a signal line 15, which leads to an external signal line connection 3.

In FIG. 2, an electrical device 20 that is connectable to the battery unit 2 is illustrated. In the electrical device 20, an electrical drive 21 is located, which, as is common, is an electric motor. Supply lines 22 and 23, which are contactable with the supply lines 12 and 13 of the battery unit 10, lead to the electrical drive 21. In one of the two supply lines 22, 23, an electrically controllable switch 24 is disposed. As the electrically controllable switch, common MOS-FETs are used. For controlling the switch 24, switching means 25 in the electrical device 20 are provided. These switching means 25 receive the control signal from the battery unit 10 via a signal line 25 that is connected to the external signal line connection 3.

In dependence on the information that the control signal is running from the battery unit 20 over the discharge state of the battery unit 20, the switching means 25 controls the switch 24. If, for example, a given minimum charging threshold is registered from the monitoring circuit 14 in the battery unit 10, a corresponding control signal transmitted to the control means 25 enables an opening of the switch 24, so that the electrical device 20 can received no further current from the battery unit 20. Instead of abruptly switching off the power of the electrical device 20, also, under certain conditions, a gradual downward switching of the power by means of the control means 25 in dependence on the control signal from the monitoring circuit 14 can be performed. Overall, the consumption of power through the electrical device 20 via the switching means 25 is controlled such that the maximum threshold value of the consumption of power is adapted constantly to the actual charging state of the battery unit 10. In this manner, the battery unit 20 operates in view of the longest possible longevity.

In the battery charger 30 illustrated in FIG. 3, a controllable current or voltage source 31 is disposed. This controllable current or voltage source includes on one hand power supplies 4 and 5, and on the other hand, guide supply lines 32 and 33 to the external supply line connections 1 and 2. Via a signal line 34, which leads to the external signal line connection 3, the controllable current or voltage source 31 receives the control signal generated from the monitoring circuit 14 in the battery unit 10. Control means in the controllable current or voltage source 31 control the charging current flowing over the supply lines 32, 33 to the battery unit 10 in dependence on the control signal formed in the battery unit 10 and transmitted to the battery charger 30. In particular, the control signal signals the switching means in the controllable current and voltage source 31, when the battery unit 10 has reach an upper charging threshold, as a result of which then the charging current is switched off or gradually driven downward from the controllable current or voltage source 31.

As previously illustrated, an information exchange via the signal lines 15, 26, 34 between the battery unit 10, the electrical device 20, and the battery charger 30 is constant. This information exchange can not only lead unidirectionally from the battery unit 10 to the electrical device 20 or battery charger 30, but also in the reverse direction. As a result of this reciprocal information exchange about the actual operating state of the respective devices 10, 20, 30, an overloading and, correspondingly, a high wear of the devices is substantially reduced.

Advantageously, the signal lines 15, 16, 34 for the reciprocal information exchange are embodied as bus lines, over which control signal data as serial data currents can be transmitted unidirectionally or bidirectionally.

It will be understood that each of the elements described above, or two or more together, may also find a useful application in other types of constructions differing from the types described above.

While the invention has been illustrated and described herein as an equipment system comprising a battery-operated electrical device, a rechargeable battery unit, and a battery charger, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, form the standpoint of prior art, fairly constitute essential characteristics of the generic or specific aspects of this invention.

What is claimed as new and desired to be protected by Letters Patent is set forth in the appended claims.

What is claimed is:

1. A handheld tool comprising:
   an electrical drive;
   at least two supply terminals;
   a battery unit, said battery unit comprising:
   (i) at least two supply terminals being electrically connectable to said supply terminals of said handheld tool; and
   (ii) a monitoring circuit configured to detect at least one operating parameter of said battery unit during operation of the handheld tool and to provide a control signal to said handheld tool to control the handheld tool during operation of the handheld tool.

2. The handheld tool of claim 1, wherein said operating parameter is a temperature or a temperature dependent parameter of said battery unit.

3. The handheld tool of claim 1, wherein said battery unit comprises a temperature sensor for detecting the temperature of at least one battery cell of said battery unit.

4. The handheld tool of claim 1, wherein said operating parameter is a discharge current of said battery unit.

5. The handheld tool of claim 1, wherein said operating parameter is a terminal voltage of at least one battery cell of said battery unit.

6. The handheld tool of claim 1, wherein said control signal is dependent on said at least one operating parameter.

7. The handheld tool of claim 1, wherein said battery unit further comprises a signal line connection to provide said control signal to said handheld tool.

8. The handheld tool of claim 1, wherein said handheld tool further comprises a signal line connection to receive said control signal from said battery unit.

9. The handheld tool of claim 1, wherein said handheld tool further comprises a switching circuit, said switching circuit being configured to receive said control signal from said battery unit.

10. The handheld tool of claim 1, wherein said handheld tool further comprises an electrically controllable switch.

11. The handheld tool of claim 10, wherein said switch is controlled by said switching circuit based on said control signal received from said battery unit.

12. The handheld tool of claim 10, wherein said switch is configured to interrupt a discharge current of said battery unit provided to said handheld tool.

13. The handheld tool of claim 10, wherein said switch is configured to reduce a discharge current of said battery unit provided to said handheld tool.

14. The handheld tool of claim 1, further comprising a battery charger, said battery charger comprising: at least two supply terminals being electrically connectable to said supply terminals of said battery unit; and a signal line connection to receive said control signal from said battery unit.

15. The handheld tool of claim 14, wherein said battery charger further comprises a current or voltage source, said current or voltage source being configured to receive said control signal from said battery unit.

16. The handheld tool of claim 15, wherein said current or voltage source comprises switching means.

17. The handheld tool of claim 16, wherein said switching means are controlled based on said control signal received from said battery unit.

18. The handheld tool of claim 16, wherein said switching means are configured to interrupt a charging current of said battery charger provided to said battery unit.

19. The handheld tool of claim 16, wherein said switching means are configured to reduce a charging current of said battery charger provided to said battery unit.

20. The handheld tool of claim 1, further comprising a signal line which is connectable to a signal line of said battery unit.

21. The handheld tool of claim 20, wherein said signal line of said handheld tool and said signal line of said battery unit are configured to transfer data unidirectionally from said battery unit to said handheld tool.

22. The handheld tool of claim 20, wherein said signal line of said handheld tool and said signal line of said battery unit are configured to transfer data bidirectionally from said battery unit to said handheld tool.

23. The handheld tool of claim 22, wherein said signal line is a serial data line.

24. A handheld tool comprising:
an electrical drive;
at least two supply terminals;
a signal line;
a battery unit, said battery unit comprising:
  (i) at least two supply terminals being electrically connectable to said supply terminals of said handheld tool; and
  (ii) a monitoring circuit configured to detect at least one operating parameter of said battery unit during operation of the handheld tool, said monitoring circuit being connectable to said signal line of said handheld tool to provide a control signal to the handheld tool to control the handheld tool during operation of the handheld tool.

25. The handheld tool of claim 24, wherein said operating parameter is a temperature or a temperature dependent parameter of said battery unit.

26. The handheld tool of claim 24, wherein said battery unit comprises a temperature sensor for detecting the temperature of at least one battery cell of said battery unit.

27. The handheld tool of claim 24, wherein said operating parameter is a discharge current of said battery unit.

28. The handheld tool of claim 24, wherein said operating parameter is a terminal voltage of at least one battery cell of said battery unit.

29. The handheld tool of claim 24, wherein said monitoring circuit is configured to provide a control signal being dependent on said at least one operating parameter.

30. The handheld tool of claim 29, wherein said battery unit further comprises a signal line being connectable to said signal line of said handheld tool for transmitting said control signal from said battery unit to said handheld tool.

31. The handheld tool of claim 24, wherein said handheld tool further comprises a switching circuit, said switching circuit being configured to receive said control signal from said battery unit.

32. The handheld tool of claim 24, wherein said handheld tool further comprises an electrically controllable switch.

33. The handheld tool of claim 32, wherein said switch is controlled by said switching circuit based on said control signal received from said battery unit.

34. The handheld tool of claim 32, wherein said switch is configured to interrupt a discharge current of said battery unit provided to said handheld tool.

35. The handheld tool of claim 32, wherein said switch is configured to reduce a discharge current of said battery unit provided to said handheld tool.

36. The handheld tool of claim 24, further comprising a battery charger, said battery charger comprising: at least two supply terminals being electrically connectable to said supply terminals of said battery unit; and a signal line being connectable to said monitoring circuit of said battery unit.

37. The handheld tool of claim 36, wherein said battery charger further comprises a current or voltage source, said current or voltage source being configured to receive a control signal from said battery unit.

38. The handheld tool of claim 37, wherein said current or voltage source comprises switching means.

39. The handheld tool of claim 38, wherein said switching means are controlled based on said control signal received from said battery unit.

40. The handheld tool of claim 38, wherein said switching means are configured to interrupt a charging current of said battery charger provided to said battery unit.

41. The handheld tool of claim 38, wherein said switching means are configured to reduce a charging current of said battery charger provided to said battery unit.

42. The handheld tool of claim 30, wherein said signal line of said handheld tool and said signal line of said battery unit are configured to transfer data unidirectionally from said battery unit to said handheld tool.

43. The handheld tool of claim 30, wherein said signal line of said handheld tool and said signal line of said battery unit are configured to transfer data bidirectionally from said battery unit to said handheld tool.

44. The handheld tool of claim 43, wherein said signal line is a serial data line.

\* \* \* \* \*